US010523931B2

(12) United States Patent
Serrano Vergara et al.

(10) Patent No.: US 10,523,931 B2
(45) Date of Patent: Dec. 31, 2019

(54) SYSTEM FOR PROJECTING IMMERSIVE AUDIOVISUAL CONTENT

(71) Applicant: BROOMX TECHNOLOGIES, S.L., Barcelona (ES)

(72) Inventors: Diego Serrano Vergara, Barcelona (ES); Pedro Serrano Vergara, Barcelona (ES)

(73) Assignee: BROOMX TECHNOLOGIES, S.L., Barcelona (ES)

( * ) Notice: Subject to any disclaimer, the term of this patent is extended or adjusted under 35 U.S.C. 154(b) by 0 days.

(21) Appl. No.: 16/091,852

(22) PCT Filed: Apr. 3, 2017

(86) PCT No.: PCT/ES2017/070199
§ 371 (c)(1),
(2) Date: Oct. 5, 2018

(87) PCT Pub. No.: WO2017/174844
PCT Pub. Date: Oct. 12, 2017

(65) Prior Publication Data
US 2019/0089950 A1    Mar. 21, 2019

(30) Foreign Application Priority Data

Apr. 7, 2016   (ES) .................................. 201630428

(51) Int. Cl.
*H04N 13/398*   (2018.01)
*H04N 9/31*     (2006.01)
(Continued)

(52) U.S. Cl.
CPC ........... *H04N 13/398* (2018.05); *G03B 37/00* (2013.01); *G06F 3/011* (2013.01);
(Continued)

(58) Field of Classification Search
CPC .. H04N 13/398; H04N 13/302; H04N 9/3147; H04N 9/3185; G03B 37/00;
(Continued)

(56) References Cited

U.S. PATENT DOCUMENTS

2005/0094111 A1    5/2005  May
2011/0171903 A1*   7/2011  Toebes .................. H04W 76/10
                                                           455/14
(Continued)

FOREIGN PATENT DOCUMENTS

EP    2849442 A1    3/2015
ES    2636782       10/2017
(Continued)

OTHER PUBLICATIONS

Fulldome, Wikipedia, Nov. 2, 2018, https://web.archive.org/web/20151217200931/https://en.wikipedia.org.
(Continued)

*Primary Examiner* — Michael E Teitelbaum
(74) *Attorney, Agent, or Firm* — Amster, Rothstein & Ebenstein LLP

(57) ABSTRACT

A system for projecting immersive content that includes an audiovisual content reproducing-projecting device with a compact container, which includes:
  at least one control module having:
  at least one wireless communication interface for communicating with a mobile terminal of a user,
  connection means connecting to the Internet,
  communication interfaces for transmitting audiovisual content obtained over the Internet from at least one content server;
  and connected to the control module;
  at least one immersive content projector and, optionally, at least one non-immersive content projector with communication interfaces;

(Continued)

at least one audio module for reproducing sound of the audiovisual content transmitted by the control module to the projectors;

a master module, emitting radio signals for at least one domotics actuator module.

15 Claims, 4 Drawing Sheets

(51) Int. Cl.
    *G03B 37/00*     (2006.01)
    *G06F 3/01*     (2006.01)
    *H04N 13/302*     (2018.01)
    *H04L 12/28*     (2006.01)
    *G06T 5/00*     (2006.01)

(52) U.S. Cl.
CPC ....... *H04L 12/2816* (2013.01); *H04N 9/3147* (2013.01); *H04N 9/3185* (2013.01); *H04N 13/302* (2018.05); *G05B 2219/163* (2013.01); *G05B 2219/2642* (2013.01); *G06T 5/006* (2013.01); *H04L 2012/2841* (2013.01); *H04L 2012/2849* (2013.01)

(58) Field of Classification Search
CPC ................. G06F 3/011; H04L 12/2816; H04L 2012/2841; H04L 2012/2849; G05B 2219/2642; G06T 5/006
See application file for complete search history.

(56) References Cited

U.S. PATENT DOCUMENTS

| 2014/0198949 A1 | 7/2014 | Garlington et al. |
| 2014/0267583 A1* | 9/2014 | Zhu ........................ H04N 19/21 348/14.13 |
| 2016/0350058 A1* | 12/2016 | Zhu ........................ G06F 3/1454 |

FOREIGN PATENT DOCUMENTS

| WO | 2008083455 A2 | 7/2008 |
| WO | 2012118769 | 9/2012 |
| WO | 2013054142 | 4/2013 |

OTHER PUBLICATIONS

Virtual Domotic Systems: a 3D interaction technique to control virtual building devices using residential gateways, Francisco Pegro Luque et al., http://www.researchgate.net/publication/224178153, Aug. 2010.

International Search Report—Application No. PCT/ES2017/070199—dated Jan. 4, 2018.

\* cited by examiner

SYSTEM FOR PROJECTING IMMERSIVE AUDIOVISUAL CONTENT

This application is a National Stage entry under 35 U.S.C. § 371 of International Patent Application No. PCT/ES2017/070199, filed on Apr. 3, 2017, which claims the benefit of and priority to Spanish Patent Application No. ES P201630428, filed on Apr. 7, 2016, the entire contents of each of which are incorporated by reference herein.

OBJECT OF THE INVENTION

The present invention generally relates to audiovisual content reproduction and projection technologies.

More particularly, the present invention relates to a reproducing-projecting system for displaying immersive audiovisual content in real spaces, offering complete visual coverage in the audiovisual content space spanning 180° to 360° around the user.

BACKGROUND OF THE INVENTION

In the simulation of fictitious spaces and actions (immersive technology) in the real world, immersive content or immersive videos, also called spherical or 360° videos, are known. These videos usually reproduce a panoramic view of a scene which can be real, made by recording the view of the scene in all possible directions at the same time by means of an omnidirectional camera or a group of cameras, or it can be virtual, made by means of 3D creation software. The immersive content is used increasingly more in marketing or advertising to attract more consumers and to "hook" them as they are able to "live" the sensations of the goods and services. They are also used in musical shows, theater, concerts, etc., to reach a broader audience without having to be present at the event; in the gaming entertainment sector and in the education sector.

In addition to recording 360° videos, immersive content production techniques require specific post-production and three-dimensional (3D) animation software, requiring computer applications that allow projecting images by equirectangular projection, cylindrical projection, stereographic projection, fisheye projection, cube mapping projection, etc.

There are currently many companies working on creating 360° audiovisual content. Companies such as GoPro, Koloreyes, Unity3D, etc., are actively developing this type of content, and other companies such as YouTube or Facebook are developing online platforms for storage and reproduction thereof in a browser. However, despite this content being in a phase of expansion, there is an imbalance between immersive content production techniques and immersive content reproduction techniques.

A known immersive content reproduction technique is the one used in domes or planetariums, but it is a very expensive technique, so it is only applied in special events and is not viable for use by individuals.

The most widespread and the only accessible immersive content reproduction technique up until now on a personal level is the use of virtual reality (VR) glasses. These glasses, however, only allow the person wearing them to enjoy the content, isolating said user from their real environment.

An existing solution is the one contemplated in WO 2012/118769, which describes a gaming image projection environment surrounding the user/player to subject them to an individual immersive experience. To that end, the system has several projectors, conventional 2D image projectors such as a plasma TV display, and 3D projectors, including an RGB projector providing a peripheral image around that projector. Nevertheless, WO 2012/118769 does not describe anything about what technical means get said projector, referred to as "environmental" in WO 2012/118769, to provide said 360° projection. On the other hand, WO 2012/118769 indicates that in order for the user to obtain the immersive 3D experience inside that projection of images, said user wears a device (headgear or glasses) configured for operating in sync with all the projectors making up said system. The system of WO 2012/118769 furthermore also requires being synchronized with the user's movements in order to be applied in an environment of players interacting with video game images, which restricts both the format of the audiovisual content that is presented and the role of the user in said immersive experience, where said user plays an active role that requires system techniques, such as head tracking, sweet spot, etc.

The objective technical problem presented is to provide a reproducer-projector for displaying immersive audiovisual content, with a visual coverage of 180° to 360°, in real spaces, for a user or a large group of users, without requiring any other device.

DESCRIPTION OF THE INVENTION

The present invention is useful for solving the aforementioned problem by solving the drawbacks of the solutions discussed in the state of the art by means of a system configured for projecting audiovisual content through a single, compact reproducing-projecting device, without accessories (glasses, depth cameras, etc.). The content can be immersive or non-immersive and be obtained from a content platform connected to the Internet (online).

The present invention relates to a system suitable for reproducing and projecting the standard immersive graphic content format (equirectangular projection) and also capable of adapting non-immersive content, which can be both high definition (HD: "High Definition", FullHD, etc.) digital and analogical (NTSC (National Television System Committee) standard, etc.), to the immersive projection by means of processes and graphic animations.

One aspect of the invention relates to an audiovisual content projection system for projecting audiovisual content which can be both immersive and non-immersive, comprising a reproducer-projector, which is a compact device, and comprising the following components:

at least one control module in turn comprising:
  at least one wireless communication interface for communicating with a mobile terminal of a user,
  connection to the Internet
  communication interfaces for transmitting to at least one projector the audiovisual content obtained over the Internet, content from at least one server, a proprietary or third-party server:
at least one immersive content projector connected to the control module by means of at least one of the aforementioned communication interfaces for projecting immersive audiovisual content transmitted by the control module through the communication interfaces with which it is connected;
at least one audio module connected to the control module for reproducing the sound of the audiovisual content transmitted by the control module to at least one content projector.

Optionally, the compact device constituting the reproducer-projector can further comprise at least one non-immersive content projector, connected to the control module by means of at least one of its communication interfaces for projecting non-immersive audiovisual content transmitted by the control module through the communication interfaces with which it is connected.

The advantages of the present invention with respect to the state of the art are essentially:

It is a compact (all-in-one) product that is easy to install (plug&play), for personal or shared use, and affordable even on a domestic level. It adapts to most indoor domestic spaces without requiring construction or reforms.

It allows customizing the user's experience through immersive, interactive and informative content, transforming the space in order to live that experience in a shared/collective manner, not individually, without requiring other devices for reproducing experiences.

The system is furthermore capable of controlling aspects of domotics (lighting, curtains, etc.) and electrical/mechanical objects in the space in which it is installed, by means of proprietary hardware, coordinating as a whole the different elements in order to enable transforming physical space at the user's will. This allows an extended immersion, i.e., a perceptual impression of immersion enhanced by the synchronized domotics control of lights (colors and intensity), audio and automated fixtures (opening/closing of curtains, inclination/movement of the bed, etc.).

The system is connected to the Internet, which enables showing real-time data from different sources and projecting it into an immersive environment generated by means of projections. It also incorporates hardware and software components that allow the user to interact with the content through different means (through a smartphone belonging to the user, by voice and/or gestures of the user, etc.).

Additionally, the system allows for interactive user navigation through the projected space in 180° or 360° in real time. The immersive projection offered by the system can be fully comprehended when the user can navigate in the universe 360° to emulate a point and field of view. Navigation can be done in a user-friendly way through the user's mobile telephone or tablet, making use of the touch screen and gyroscope amenities in the user's terminal. The parameters for 360° navigation involve an infinite horizontal rotation and an invariable vertical rotation, as well as the possibility of zooming in/out on projected images. Also, by using depth cameras, a gesture-based navigation is possible, allowing control by means of gestures, for example by incorporating a Kinect module.

With respect to the system described in WO 2012/118769 mentioned in the state of the art above, the present invention gives the user more freedom and allows the user to be a passive spectator if desired as it is not necessarily a system for a gaming environment. WO 2012/118769, which specifically relates to gaming environments, only considers immersive experiences of an individual, while the present invention contemplates the possibility of collective immersive experiences, of multiple users inside the projected space. The present invention furthermore offers the user connectivity with the Internet Cloud and interaction with the system through their mobile telephone. The system of the invention is adapted to said terminal of the user, without the user having to modify it. As regards the projectors, in the system of the invention neither spatial nor temporal continuity between the projectors (one is not located right after another one, as is the case of WO 2012/118769) is required, but rather the projectors must provide independent content: one is a non-immersive or "informative" content projector and the other one is an "environmental" projector with immersive content. Furthermore, in WO 2012/118769 image geometry correction is done based on perspective and color correction, while the present invention counteracts the distortion of an equirectangular image as a result of the fisheye lens included in the "environmental" immersive content projector. In WO 2012/118769, the projected audiovisual content is produced entirely and specifically for the gaming device, so the solution of said patent document does not adapt to pre-existing content in common formats; in contrast, the system of the invention is designed for reproducing standard formats (equirectangular, HD, etc.). Additionally, the option provided by the present invention of the system having functions relating to domotics is not provided for in WO 2012/118769.

The present invention can be applied to the following sectors, to name just a few examples:

Hotel and tourism sector: ideal for hotel rooms.
Entertainment and restaurant sector: ideal for unique corners in restaurants and bars hosting musical events.
Health sector: ideal for hospital rooms and other areas (sensory delivery rooms).
Business sector: ideal for creating experiences relating to product branding and exposure.
Cruise ship sector: ideal for cruise ship cabins
Domestic sector: ideal for creating immersive environments in the home.

BRIEF DESCRIPTION OF THE DRAWINGS

A series of drawings that help to better understand the invention and that are expressly related to an embodiment of said invention presented as a non-limiting example thereof is very briefly described below.

PREFERRED EMBODIMENT OF THE INVENTION

Figure 1:
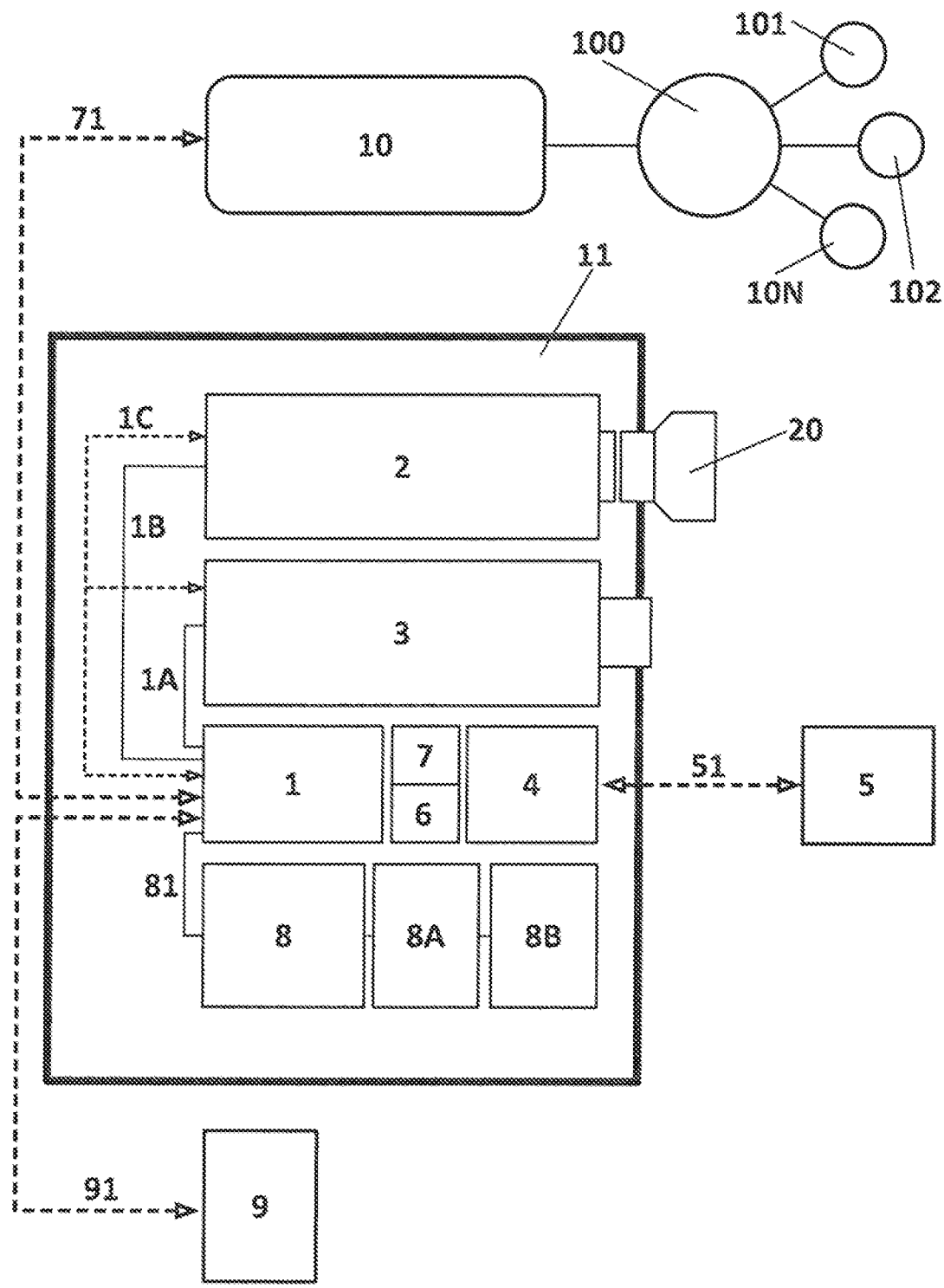
FIG. 1 shows a block diagram of the architecture of the system for projecting immersive content, according to a preferred embodiment of the invention.

FIG. 1 shows a system for projecting immersive content comprising an audiovisual content reproducing-projecting device (11) in turn comprising inside a compact container (400):

at least one control module (1) comprising processing means for managing interaction with the user, connection means (71) for connecting to the Internet (100) and at least one communication interface (1A, 1B, 1C) for transmitting audiovisual content; in a preferred embodiment, the control module (1) obtains the audiovisual content from at least one content server (10) over the Internet (100); in another possible embodiment, it obtains the content from at least one local data storage unit;

at least one immersive content projector (2) and at least one non-immersive content projector (3), connected to the control module (1) by means of at least one of the communication interfaces (1A, 1B, 1C), which can be, for example, a high-definition multimedia interface or HDMI (1A, 1B), or a Wi-Fi interface (1C);

at least one audio module (8) connected to the control module (1), for example by means of a line cable (81), for reproducing the sound of the audiovisual content transmitted by the control module (1).

In a possible embodiment of the invention, the audio module (8) comprises the following components: a right loudspeaker (8A), a left loudspeaker (8B), an audio amplifier and a subwoofer complementing the two other loudspeakers (8A, 8B).

The control module (1) is connected to the Internet (100) by means of a third or fourth generation wireless telephony standard; preferably, the connection means (71) for connecting to the Internet (100) use 4G. To that end, the reproducing-projecting device (11) comprises mobile telephony equipment (7) to provide the system with a fast connection to the Internet (100) and with enough bandwidth to receive and transmit audiovisual content. The mobile telephony equipment (7) can be connected, for example by means of a Universal Serial Bus, or USB, to a wireless connector (6), which is preferably a Wi-Fi router. This wireless connector (6) allows creating a proprietary wireless network, for example, a Wi-Fi network, to control the projectors (2, 3) and have access to the Internet (100). As an alternative to 4G, the Wi-Fi router of the reproducing-projecting device (11) can be connected by means of Ethernet with an external router to an Internet server. Also, the wireless Wi-Fi connector (6) is connected to the control module (1) through the Ethernet.

The control module (1) is connected to the Internet (100) through 4G communication or connection means (71) in order to access the immersive and/or non-immersive content that the audiovisual content servers (10) have, said content being obtained from a proprietary platform or from third-party platforms (101, 102, 10N), such as YouTube360, Facebook360, etc. The audiovisual content server or servers (10) delivers the data to the control module (1) so that it can prepare the content, whether immersive or non-immersive, to be reproduced by the corresponding projectors (2, 3) of the reproducing-projecting device (11) and projected in an immersive manner into space (401), typically a room with three walls and a ceiling.

Figure 2:
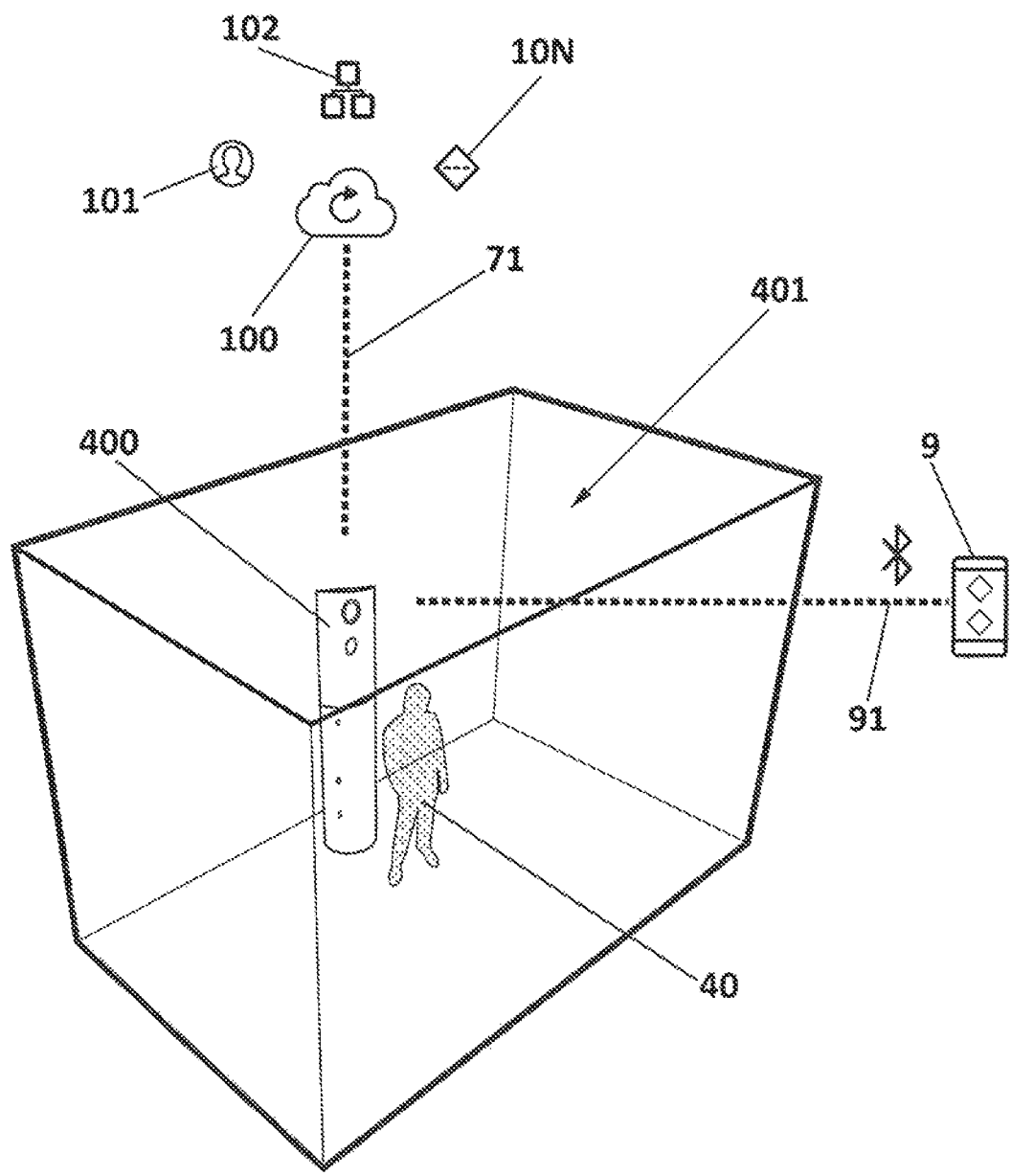
FIG. 2 shows a possible scene of application of the system, according to a possible embodiment of the invention.

FIG. 2 shows an example of a scene in which the system can be used, where the user (40) experiences at least a 180° immersion with the images projected 360° in the space (401). In one example, the reproducing-projecting device (11) spans 180° but projects content in 360°. The reproducing-projecting device (11) has a compact container (400) inside which the projectors (2, 3) and the audio module (8) are connected to the control module (1), which is also connected to the mobile telephony equipment (7) and to the wireless connector (6) for communications.

The user (40) has a mobile terminal (9), which can be a smartphone, a laptop computer or a tablet, etc., running therein a computer application that communicates with the control module (1) through a wireless communication interface (91), for example, a Bluetooth Low Energy, BLE, interface. This computer application of the mobile terminal (9) can also communicate with the control module (1) through the wireless connector (6), for example, by means of Wi-Fi. The computer application is configured to allow the user (40) remote control of and interaction with the reproducing-projecting device (11) through the user's mobile terminal (9).

Additionally, there is also included inside the container (400) as part of the reproducing-projecting device (11) a master module (4), which is an electronic circuit configured for emitting orders to different actuator modules or nodes (5), which are circuits for receiving signal via radio (51) and actuators with the capacity to control home automation aspects/equipment, i.e., domotics, such as lighting, curtains, blinds, etc., as well as electrical and/or mechanical objects of the room in which the reproducing-projecting device (11) is installed. Communication between master module (4) and each actuator module (5) is by radio frequency (51). The master module (4) can be connected by USB to the control module (1) of the reproducing-projecting device (11).

All the components of the reproducing-projecting device (11) and the actuator modules (5), which can be external to said device, are powered through a power cable plugged into an electrical outlet. The actuator modules (5) can also have their own battery.

Figure 3:
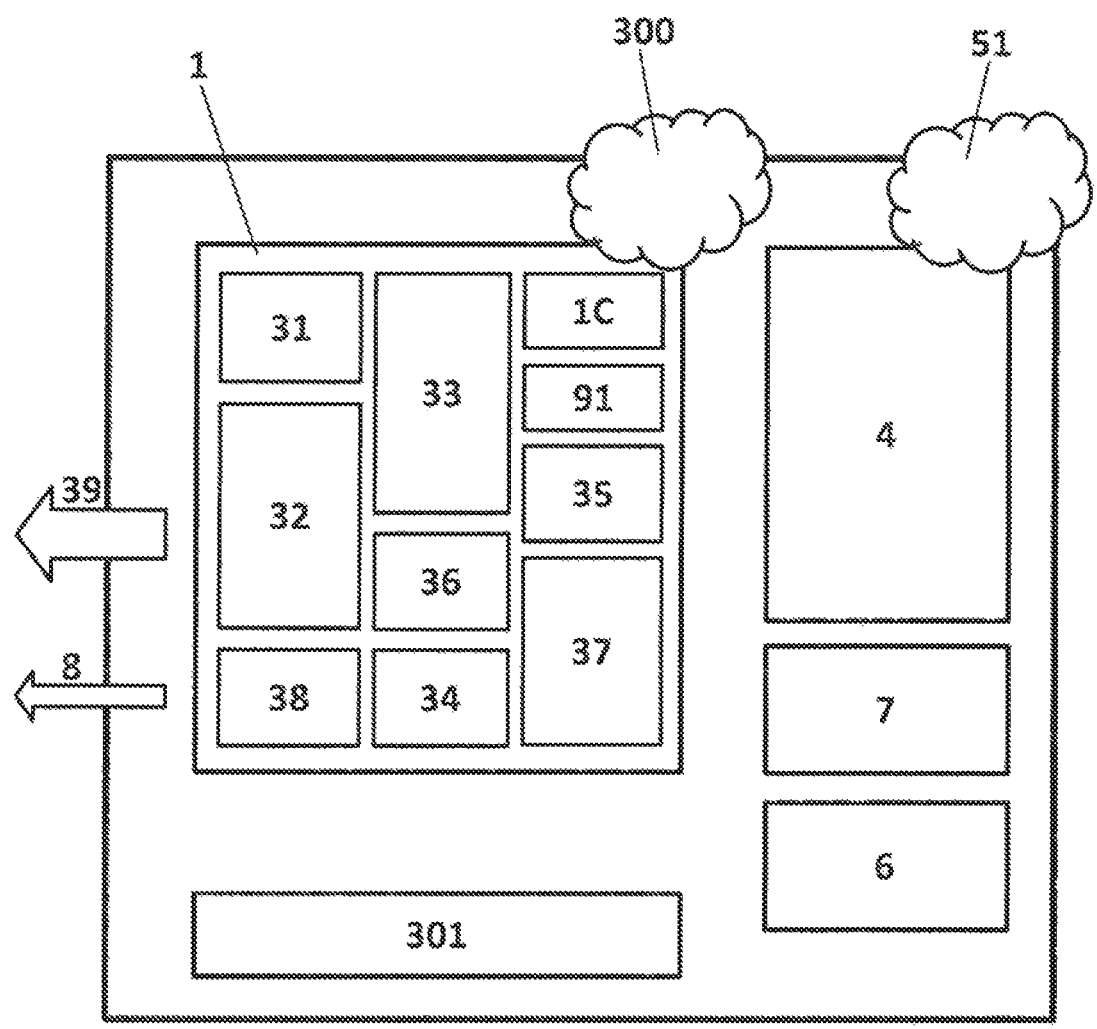
FIG. 3 shows a block diagram of the internal architecture of the control module of the system and of the external and internal communications of the system, according to a possible embodiment of the invention.

FIG. 3 shows a possible implementation of the control module (1) connected by USB to 4G mobile telephony equipment (7), to a wireless connector (6), which is a Wi-Fi router, and provides an internal Wi-Fi network (300) for communication with other components of the reproducing-projecting device (11), and to a master module (4) transmitting orders over radio frequency (51). According to the example of a possible implementation, the control module (1) comprises:

an Intel® NUC5iMYHE i5-5300 vera processor (31);
an Intel® 5500 graphics card (32);
a solid-state drive or SSD (33) with a 256 GB storage capacity and mounted on the motherboard;
an 8 GB RAM memory (34) mounted on the motherboard;
a Wi-Fi and Bluetooth adapter, mounted on the motherboard, to provide the Wi-Fi communication interface (1C) and BLE communication interface (91);
Ethernet connection (35);
USB connectors (36);
two HDMI connections (39) to the two projectors (2, 3);
RCA audio connectors (39) to self-amplified loudspeakers of the audio module (8);
a 220$V_{AC}$ electric power connector (301); and
a fan (37).

Figure 4:
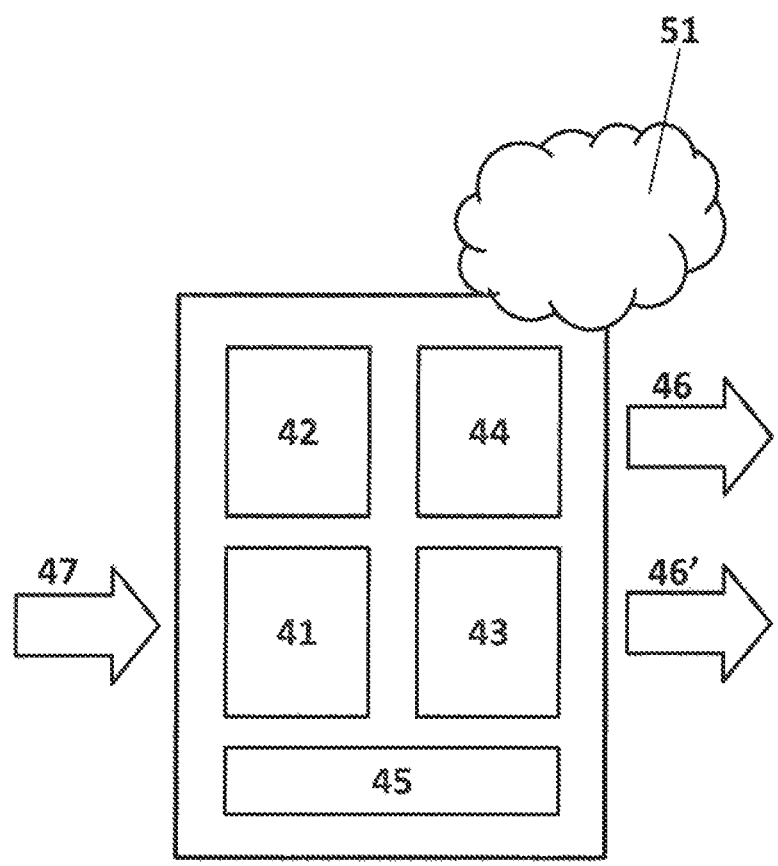
FIG. 4 shows a block diagram of the internal architecture of an actuator module of the system, according to a possible embodiment of the invention.

FIG. 4 shows a possible implementation of an actuator module (5), comprising:

a CPU (41) receiving input data from sensors (47);
a radio module (42) for connection by radio frequency (51) with the master module (4);
input/output relays (43) for acting on electronic devices (46) operating at 220$V_{AC}$;
pulse width modulation, PWM, controller (44) for acting on electronic devices (46') operating at 12V-24V, such as lights or motors in blinds, etc.; and
a 220$V_{AC}$ electric power connector (45).

According to a possible implementation of the reproducing-projecting device (11), the projectors (2, 3), connected to the control module (1) by means of HDMI interfaces (1A, 1B) and/or a Wi-Fi interface (1C), are described as follows:

an immersive content projector (2) comprising an Epson® EH-TW5350 Full HD, 2200 Lumen, projector and Navitar's 3.5× fisheye conversion lens (20), for projecting immersive visuals with a 180° horizontal and 100° vertical angle of vision, which in a room means projecting on 3 walls and a ceiling;

a non-immersive content projector (3) complementing the main immersive projector (2) and comprising an Epson® EH-TW5350 Full HD, 2200 Lumen, projector for projecting non-immersive visuals that nevertheless offer maximum quality, currently FullHD resolution, in 16:9 format.

The non-immersive content projector (3) provides a perpendicular projection on the opposite wall, with a mechanical geometry correction of the projector, for example, correcting the shape of the image with slide control tools like Epson® Keystone, or quick-corner for adjusting an unequally rectangular image from a selected corner of the image. This can also be done by means of perspective correction using software. Furthermore, the non-immersive content projector (3) provides suitable contrast for informative content: text, television, gaming consoles, etc.

The immersive content projector (2) has a fisheye conversion lens (20) coupled to the Epson® projector to provide an immersive projection of 180° horizontally and +/−100° vertically. To correct the image geometry and adapt the images to an immersive projection, the following methods are performed:

For 360°/180° equirectangular content, it is projected with the original geometric distortion provided. The 360° section of the image to be projected is selected during reproduction, and the equirectangular projection is counteracted, or cancelled out, by the final distortion of the fisheye conversion lens (20).

For semispherical-shaped content, the geometric distortion provided by the projection is cancelled out by the final distortion of the fisheye conversion lens (20).

For non-immersive content, geometric fisheye correction from fisheye to planar is performed by means of Bezier curves.

Additionally, the reproducing-projecting device can include a self-calibrating gauge to detect surfaces automatically and to adjust the projection of the images in real time to the detected surfaces.

Another possible embodiment of the invention consists of connecting two or more reproducing-projecting devices, which are placed in the center of the room, to achieve immersive projection 360° horizontally instead of just 180° horizontally.

The invention claimed is:

1. A system for projecting immersive content, comprising an audiovisual content reproducing-projecting device having a compact container comprising:
    at least one control module comprising:
        at least one wireless communication interface for communicating with a mobile terminal of a user,
        connection means for connecting to the Internet,
        a plurality of communication interfaces for transmitting audiovisual content obtained from at least one of a local data storage unit and over the Internet from at least one content server;
    at least one immersive content projector connected to the control module by at least one of the communication interfaces;
    the at least one immersive content projector configured to project spherical equirectangular images and including an image projector and a fisheye conversion lens coupled to the image projector to provide an immersive projection of 180° horizontally;
    at least one audio module connected to the control module for reproducing sound of the audiovisual content transmitted by the control module.

2. The system according to claim 1, where the connection means for connecting to the Internet includes mobile telephony equipment connected to the control module.

3. The system according to claim 2, wherein the mobile telephony equipment is fourth generation, 4G, equipment.

4. The system according to claim 2 wherein the mobile telephony equipment is connected through a USB interface to a wireless connector that communicates with the mobile terminal of the user and with the Internet.

5. The system according to claim 4, wherein the wireless connector is a Wi-Fi router.

6. The system according to claim 1, wherein the communication interfaces for communication with the projectors are selected from a group consisting of an HDMI interface and a Wi-Fi interface.

7. The system according to claim 1, wherein the wireless communication interface for communication with the mobile terminal is a Bluetooth Low Energy, BLE, interface.

8. The system according to claim 1, further comprising a master module, connected to the control module, that communicates via radio with at least one actuator module, the master module being configured for emitting orders to the actuator module which, in response to receiving the orders, acts on electronic equipment.

9. The system according to claim 8, wherein the actuator module acts on home automation equipment.

10. The system according to claim 8, wherein the master module is connected to the control module through a USB interface.

11. The system according to claim 1, wherein the mobile terminal comprises a remote control device for remote control of the system.

12. The system according to claim 11, wherein the mobile terminal is selected from a group consisting of a smartphone and a tablet.

13. The system according to claim 3, wherein the mobile telephony equipment is connected through a USB interface to a wireless connector that communicates with the mobile terminal of the user and with the Internet.

14. The system according to claim 13, wherein the wireless connector is a Wi-Fi router.

15. The system according to claim 7, wherein the master module is connected to the control module through a USB interface.

* * * * *